United States Patent

[11] 3,557,862

| [72] | Inventor | Harold S. Mains<br>Akron, Ohio |
|---|---|---|
| [21] | Appl. No. | 847,050 |
| [22] | Filed | Aug. 4, 1969 |
| [45] | Patented | Jan. 26, 1971 |
| [73] | Assignee | The City Machine and Wheel Company<br>Akron, Ohio<br>a corporation of Ohio |

[54] TIRE MOUNTING MACHINE
10 Claims, 9 Drawing Figs.

| [52] | U.S. Cl. | 157/1.24 |
|---|---|---|
| [51] | Int. Cl. | B60c 25/06 |
| [50] | Field of Search | 157/1.22, 1.24 |

[56] References Cited
UNITED STATES PATENTS
3,038,528  6/1962  Cunningham..............  157/1.24

*Primary Examiner*—Granville Y. Custer, Jr.
*Attorney*—Hamilton, Cook, Renner & Kenner ABSTRACT: A machine for mounting tubeless tires on wheel rims in which a platform for supporting a rim in horizontal position has a peripheral notch for facilitating "buttoning" a tire casing thereover to a position below the platform, and a cam lug is rotatably mounted on the platform to progressively raise a tire bead over the lower rim flange and position the bead on the adjacent bead seat of the rim, said cam lug being automatically stopped at a predetermined position at the end of one revolution.

PATENTED JAN 26 1971

INVENTOR.
HAROLD S. MAINS
BY Hamilton, Cook,
Renner & Renner
ATTORNEYS

PATENTED JAN 26 1971

INVENTOR.
HAROLD S. MAINS
BY Hamilton, Cook,
Renner & Kenner
ATTORNEYS

PATENTED JAN 26 1971

INVENTOR.
HAROLD S. MAINS
BY Hamilton, Cook
Renner & Kenner
ATTORNEYS

PATENTED JAN 26 1971

INVENTOR.
HAROLD S. MAINS
BY Hamilton, Cook,
Renner & Kenner
ATTORNEYS

TIRE MOUNTING MACHINE

BACKGROUND OF THE INVENTION

Various hand tools and mounting devices for pneumatic tires on rims have been in use for many years, and when inner tubes were used any slight damage to the tire bead portions was not important as the air was sealed within the tube.

With the advent of the tubeless tire it became essential that the tire bead portions were not damaged as they are seated on the bead seats of the rim for making an airtight seal. The outer surfaces of the tire beads are usually covered with butyl rubber, and sometimes provided with sealing ribs, to assist in sealing the tire against the escape of air. Thus, it is important that the tire bead surfaces be not marked or damaged so as to detract from the sealing abutment with the rim bead seats, as would be likely from using an ordinary prying tool to force the tire bead over the rim flange of a conventional one-piece drop center rim.

Many prior machines for mounting tubeless tires have supported the wheel rim in horizontal position, and have provided means for forcing the beads of a tubeless tire casing downwardly over the upper rim flange. In such machines it is usually necessary to force one bead and then the other over the rim flange which has sharp edges and imperfections due to mass production. Thus, both beads are subjected to probable damage. Moreover, the mechanism for forcing the tire beads over the rim flange is usually unduly complicated and expensive.

SUMMARY OF THE INVENTION

An important object of the present invention is to provide an improved tire mounting machine for mounting tubeless tires on wheel rims which is simple and inexpensive to construct and extremely rapid and easy to operate.

Another object is to provide an improved tire mounting machine which normally engages only one of the tire bead portions in positioning the tire on the rim without affecting the sealing ability of said bead portions on the rim.

A further object is to provide an improved tire mounting machine having a rim supporting periphery which guides the tire beads over the rim flange so as to protect the beads from forcibly engaging the rim flange.

These and other objects are accomplished by the improvements, parts and combinations comprising the present invention, preferred embodiments of which are shown by way of example in the accompanying drawings and described herein, the scope of the invention being defined in the appended claims.

DESCRIPTION OF A PREFERRED EMBODIMENT

Figure 1:
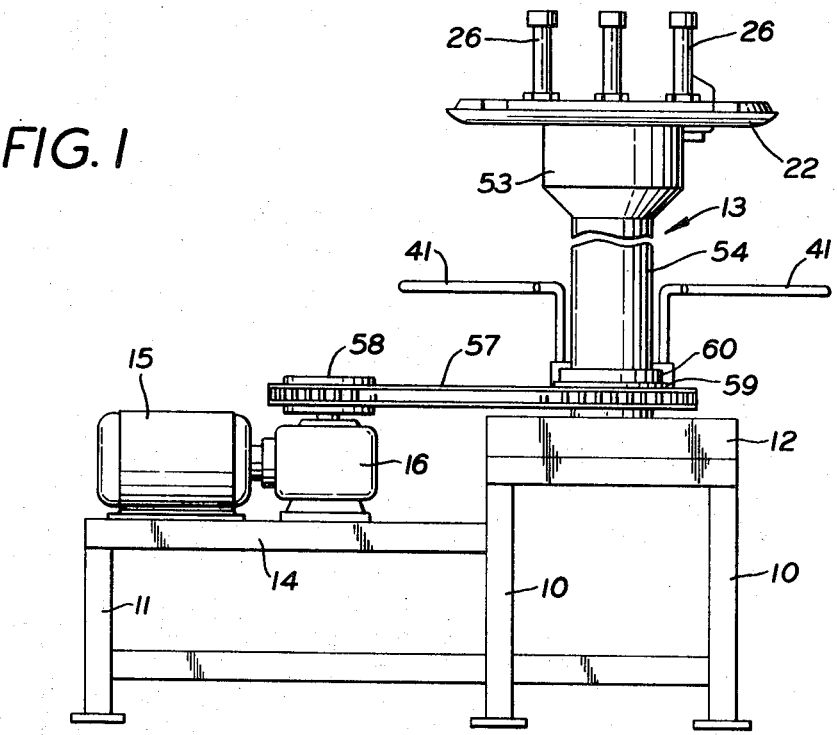
FIG. 1 is a side elevational view of a preferred embodiment of the improved machine.

The improved machine shown in FIG. 1 rests on a base frame consisting of legs 10 and 11 supporting a platform 12 carrying the tire mounting mechanism indicated as a whole at 13, and a platform 14 carrying the driving mechanism comprising a motor 15 and a gear reducer 16. The tire mounting mechanism has a vertical shaft 17, the lower end of which is received in a socket in the platform plate 12, the shaft being secured thereto by a bolt 18 extending axially through said shaft 17. Preferably, the upper end of the bolt 18 is threaded, for a purpose to be described.

The upper end 19 of the shaft 17 is reduced in diameter to form a shoulder 20, and a cup-shaped bearing member 21 is secured on the reduced end 19 and seated on shoulder 20. The supporting platform or plate 22 for the rim 23 is mounted on top of the bearing member 21 by screw studs 24, and has a center opening 25 registering with the opening within the bearing member 21.

Figure 3:
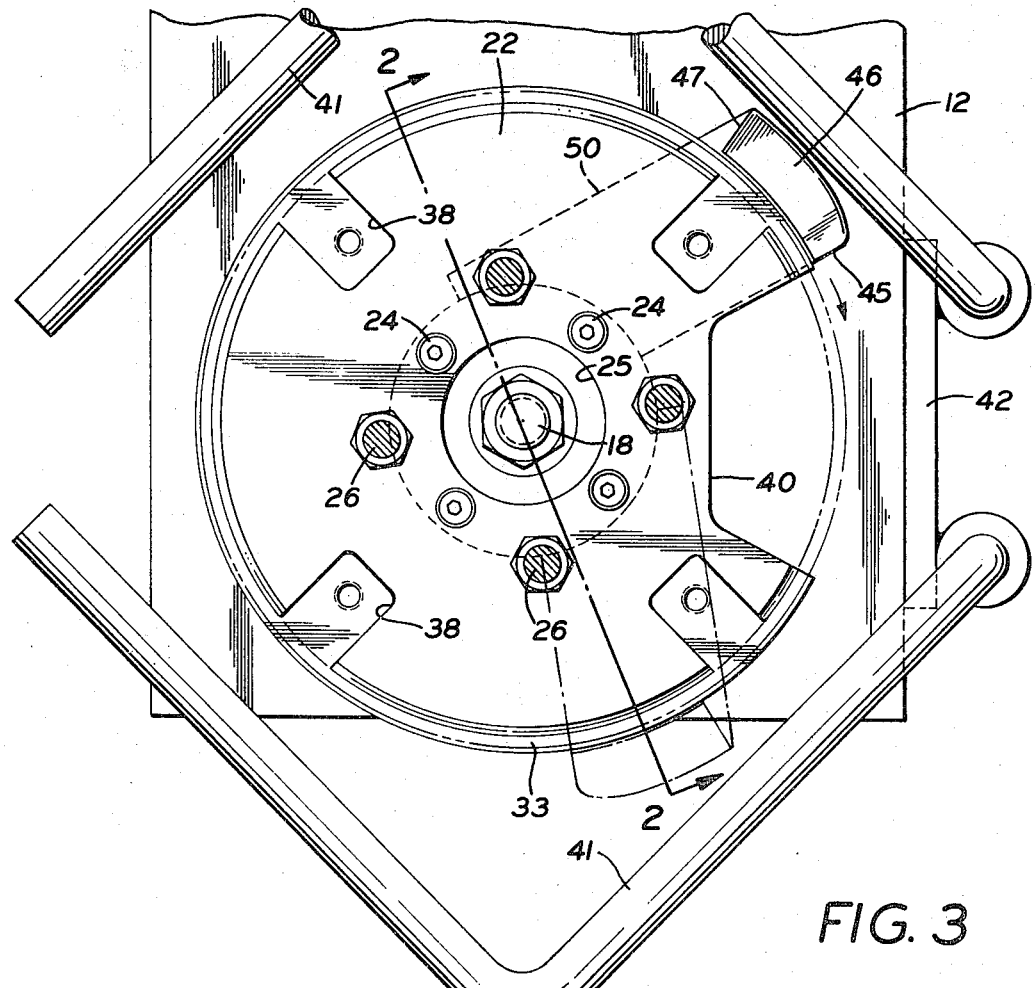
FIG. 3 is a plan view as on line 3-3 of FIG. 2 with the tire and rim removed and the rim flange shown in chain lines.

The means for positioning the rim 23 on the plate 22 may consist of pins 26 having threaded lower ends for screwing into threaded holes 27 in the plate. These are used when the web of the rim has holes 28 for receiving mounting bolts or studs to mount the rim on a vehicle. Four pins 26 are shown in FIG. 3, but the number may vary for different rims.

Figure 9:
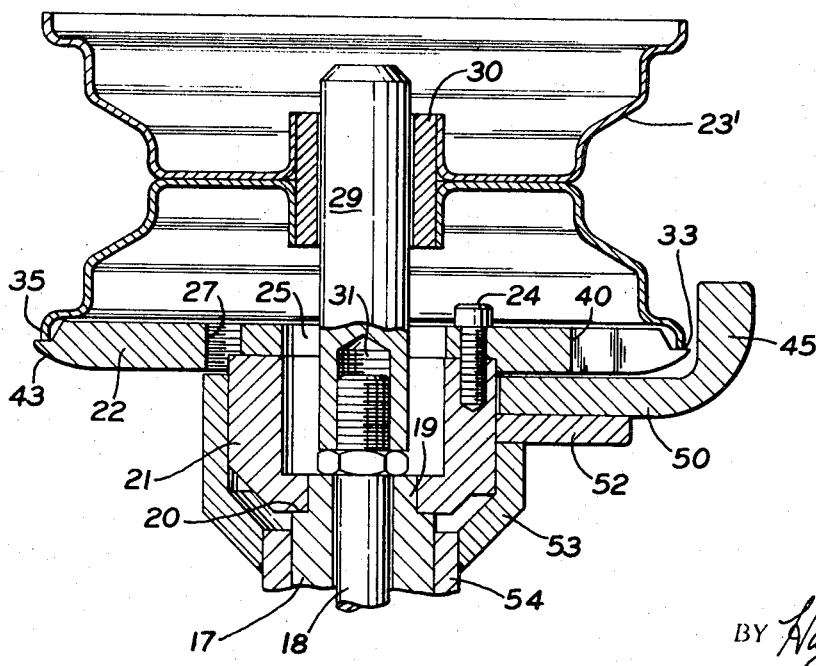
FIG. 9 is a partial sectional view similar to FIG. 2 showing a center post for positioning a different type of rim on the supporting platform.

The rim 23' shown in FIG. 9 does not have bolt holes in its web, and in such case an axial post 29 for extending through the axle bearing 30 of the rim has its lower end counterbored and tapped at 31 for screwing onto the upper threaded end of bolt 18.

Figure 8:
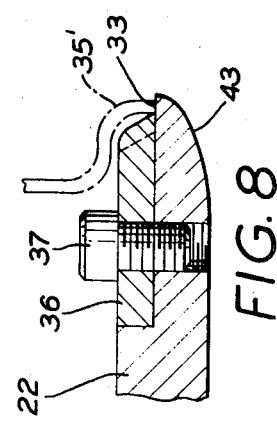
FIG. 8 is a sectional view on line 8-8 of FIG. 7.
Figure 7:
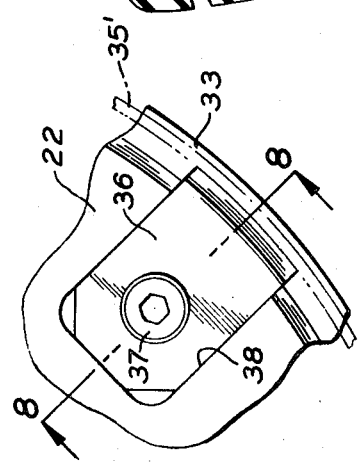
FIG. 7 is an enlarged partial plan view showing one of the inserts for positioning a slightly larger size rim on the supporting platform.

The upper surface of the plate 22 is beveled around its periphery to form an annular flat outer surface or shelf 33 to receive and support the bottom edge of the lower rim flange 35 when the rim 23 or 23' is positioned on the plate. This shelf 33 is wide enough to support rim flanges of slightly varying diameters, and when the rim flange is of a size such as to rest on the outer edge of the shelf, inserts 36 are mounted by screw studs 37 in the four radial slots 38 in the plate, as seen in FIGS. 7 and 8, the outer edges of the inserts engage the inner edge of a rim flange 35' which rests on the outer edge of the shelf 33. However, the outer edge of the shelf 33 should always have at least as large a diameter as that of the outer edge of the rim flange.

Figure 2:
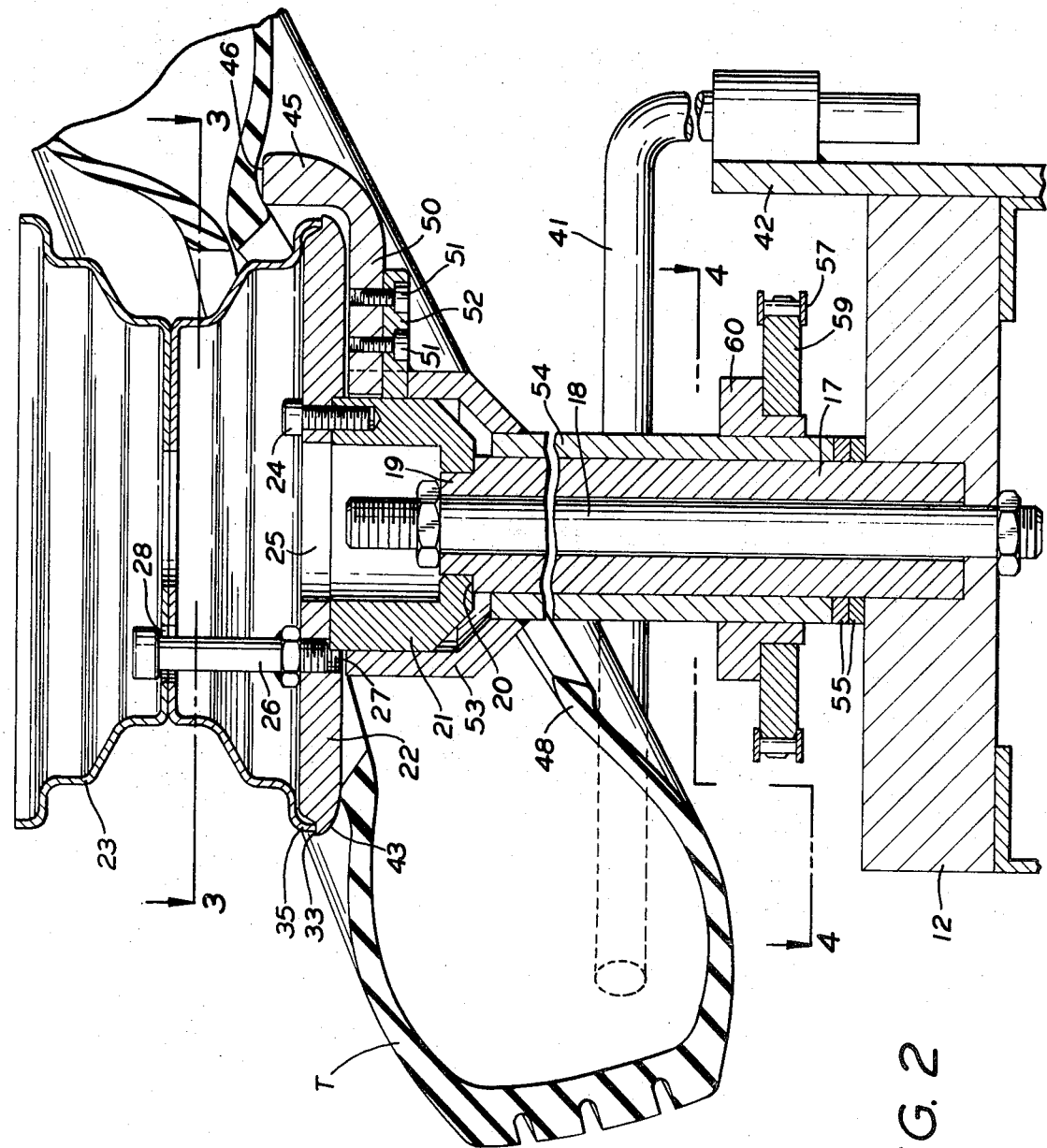
FIG. 2 is an enlarged partial sectional view thereof as on line 2-2 of FIG. 3 with the pusher cam rotated to the phantom position, showing a rim supported on the plate and a tire in position at the beginning of the mounting operation.

A notch 40 of substantial radial depth and circumferential width is provided in the plate 22, and this notch facilitates passing a tire casing such as the casing T in FIG. 2 over the plate by entering a portion of the casing in the notch, before the rim is positioned on the plate, and by passing or "buttoning" the tire in inclined position over the plate. A pair of V-shaped horizontal supporting rods 41 are mounted at one end on bracket plate 42 on the platform 12 for supporting the casing temporarily below the plate 22. As shown in FIGS. 2 and 8, the bottom peripheral surface 43 of the plate is rounded, and its surface is polished, for a purpose to be described.

Figure 5:
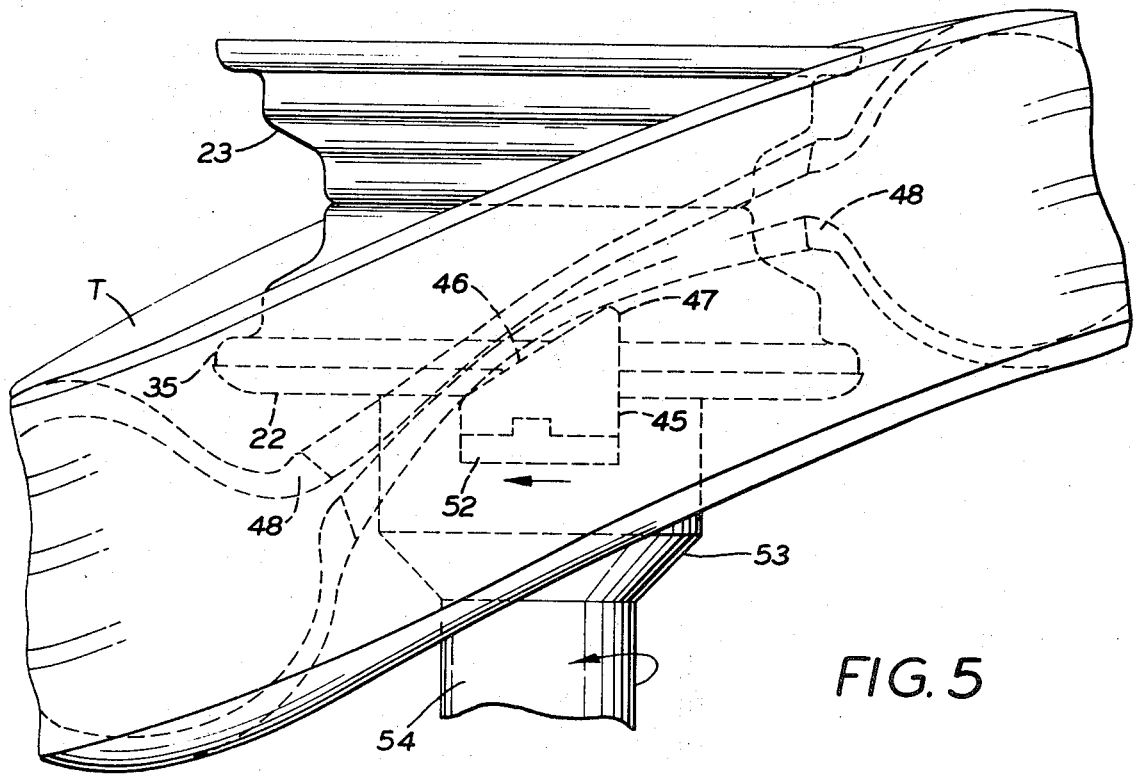
FIG. 5 is a side elevational view showing the tire partially positioned on the rim.

The means for progressively raising the bead portions of a tire casing over the lower rim flange 35 of a rim 23 or 23' seated on the plate 22 comprises a cam lug 45 extending upwardly around and adjacent to the peripheral shelf 33 of the plate. The upper cam surface 46 of the lug is inclined, as shown in FIG. 5, and the high point 47 of the lug is adapted to raise the lower bead portion 48 of the tire T well above the lower rim flange 35.

The lower part of the lug 45 curves under the plate and merges into an arm 50 which is secured by screws 51 to the upper side of a bracket plate 52, which is secured as by welding to a cup-shaped bearing member 53 journaled on bearing member 21. The bearing member 53 is secured as by welding to a hollow shaft 54 journaled on shaft 17 and supported at its bottom end by thrust bearing rings 55. Obviously, the machine can handle a range of rim sizes by substituting different size plates 22, and corresponding arms 50 of different lengths.

Figure 4:
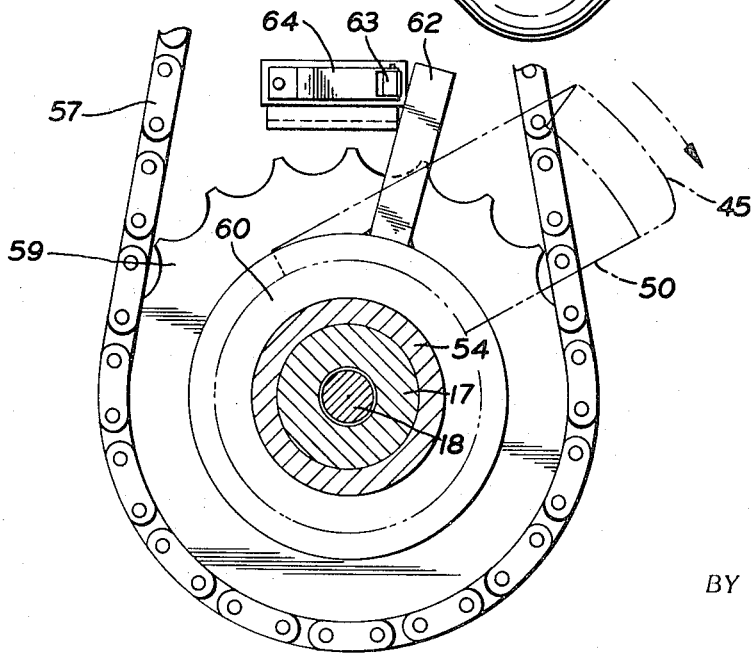
FIG. 4 is a plan sectional view as on line 4-4 of FIG. 2.

The means for rotating the arm 50 and cam lug around the plate 22 (clockwise as viewed in FIGS. 3 and 4) comprises a drive chain 57 meshed onto a sprocket 58 driven by gear reducer 16 (FIG. 1) and onto a sprocket 59 on a hub 60 secured to the lower portion of hollow shaft 54 (FIG. 2).

At the start of the tire mounting operation the cam lug 45 is always at a predetermined position, preferably adjacent to the notch 40, as shown in FIG. 1, in readiness to pass around the notch as it starts to rotate clockwise. In order to stop the lug in this position after one rotation, a trip arm 62 (FIG. 4) is secured to hub 60 and its outer end passes over the roller 63 of a limit switch 64 in circuit with the drive motor 15 to stop the motor when the lug is in position. A conveniently located starting switch, such as a pedal type switch (not shown) is actuated by the operator to start rotation.

In operation, a tire casing T is first "buttoned" over the plate 22 in the manner previously described, and allowed to rest on the supporting rods. Next a rim 23 or 23' is positioned on the plate with its lower rim flange resting on the peripheral shelf 33. The operator then lifts that portion of the tire casing which is on the far side of the notch opposite to the cam 45 and, while holding the bead portions up against the bottom edge of the plate 22, trips the starting switch to start the cam lug 45 to rotate. Obviously, the tire can be lifted to an inclined position and held manually, or power jack means could be provided and would be desirable for lifting heavier tires.

Figure 6:
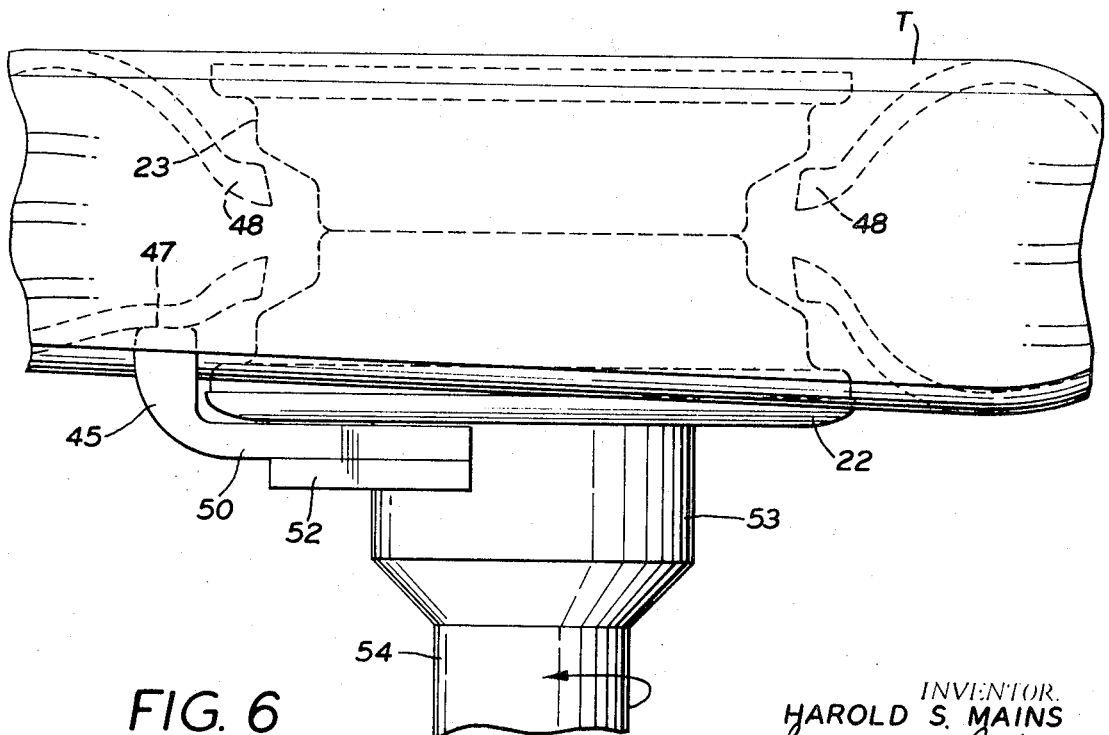
FIG. 6 is a similar view showing the tire at the finish of the positioning operation.

As the cam lug rotates past the notch 40 and approaches the raised portion of the lower tire bead 48, the lower edge of the inclined cam surface 46 engages under the bead, and as the bead rides up the inclined surface carrying the upper bead with it, the beads are pushed upwardly over the smooth under surface 43 of the plate and above the rim flange 35 so as to snap inwardly toward the drop center portion of the rim without engaging the sharp edge of the flange. As the cam lug continues to rotate, it progressively raises the beads to the position indicated in FIG. 5, so that they occupy the position indicated in FIG. 6 by the time the cam lug reaches the starting point shown in full lines in FIG. 3. It is important to have the cam lug rotate past the notch 40 before engaging the lower tire bead to avoid raising the beads into engagement with the edge of the rim flange where it spans the notch 40.

The improved apparatus is simple to build and easy to operate, enables mounting tires on rims rapidly, and avoids damage to the tire bead portions.

I claim:

1. Apparatus for mounting tire casings on wheel rims comprising a plate for supporting a rim in substantially horizontal position and having an outer circumference at least as large as the outer circumference of the rim flange supported thereon, a support for the plate, said plate having a notch in its periphery to facilitate passing a tire casing downwardly over the plate, a cam lug rotatably mounted on said plate support to extend upwardly alongside of the outer circumference of said plate, and means for rotating said lug around said plate to progressively lift the bead portions of a tire held against the underside of the plate over the outer edge portion of the plate.

2. Apparatus as in claim 1, in which the under surface of the outer edge portion of the plate is smooth and curved upwardly.

3. Apparatus as in claim 1, in which the top surface of the plate is beveled at its outer edge portion to provide a peripheral shelf for supporting a rim flange.

4. Apparatus as in claim 1, in which inserts are provided on the plate to engage the inner surface of a rim flange supported on the plate and having an outer circumference substantially equal to that of the plate.

5. Apparatus as in claim 1, in which means are provided for stopping the cam lug at a predetermined position after one rotation.

6. Apparatus as in claim 2, in which the top surface of the plate is beveled at its outer edge portion to provide a peripheral shelf for supporting a rim flange.

7. Apparatus as in claim 2, in which inserts are provided on the plate to engage the inner surface of a rim flange supported on the plate and having an outer circumference substantially equal to that of the plate.

8. Apparatus as in claim 2, in which means are provided for stopping the cam lug at a predetermined position after one rotation.

9. Apparatus as in claim 3, in which inserts are provided on the plate to engage the inner surface of a rim flange supported on the plate and having an outer circumference substantially equal to that of the plate.

10. Apparatus as in claim 3, in which inserts are provided on the plate to engage the inner surface of a rim flange supported on the plate and having an outer circumference substantially equal to that of the plate, and in which means are provided for stopping the cam lug at a predetermined position after one rotation.